Dec. 27, 1932.　　　　　G. GOEBEL　　　　　1,891,976
MOLD OPENING APPARATUS
Filed Dec. 15, 1931　　　4 Sheets-Sheet 1
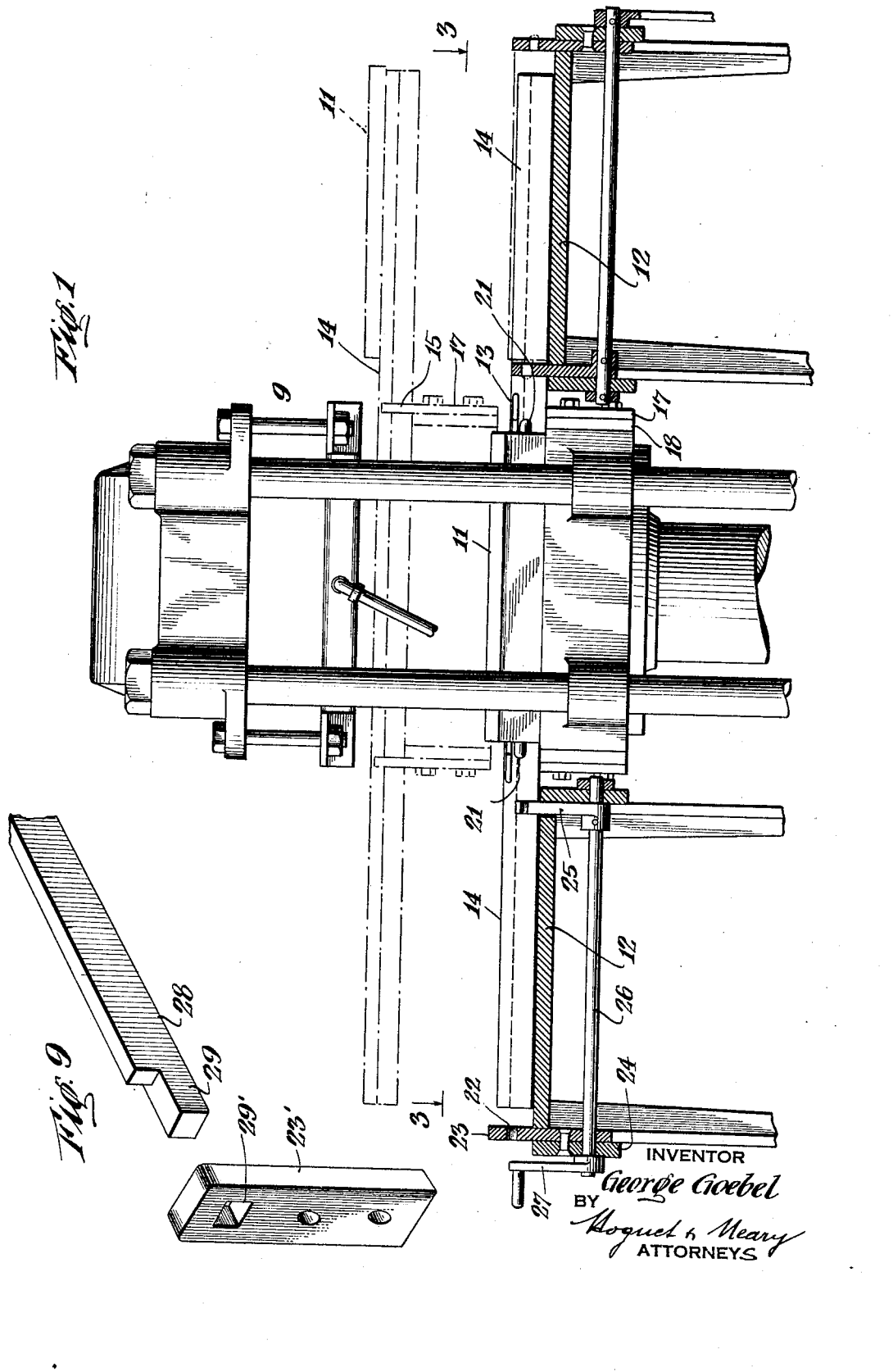
INVENTOR
George Goebel
BY
Boquet & Neary
ATTORNEYS Dec. 27, 1932.                G. GOEBEL                1,891,976
                        MOLD OPENING APPARATUS
                        Filed Dec. 15, 1931            4 Sheets-Sheet 2
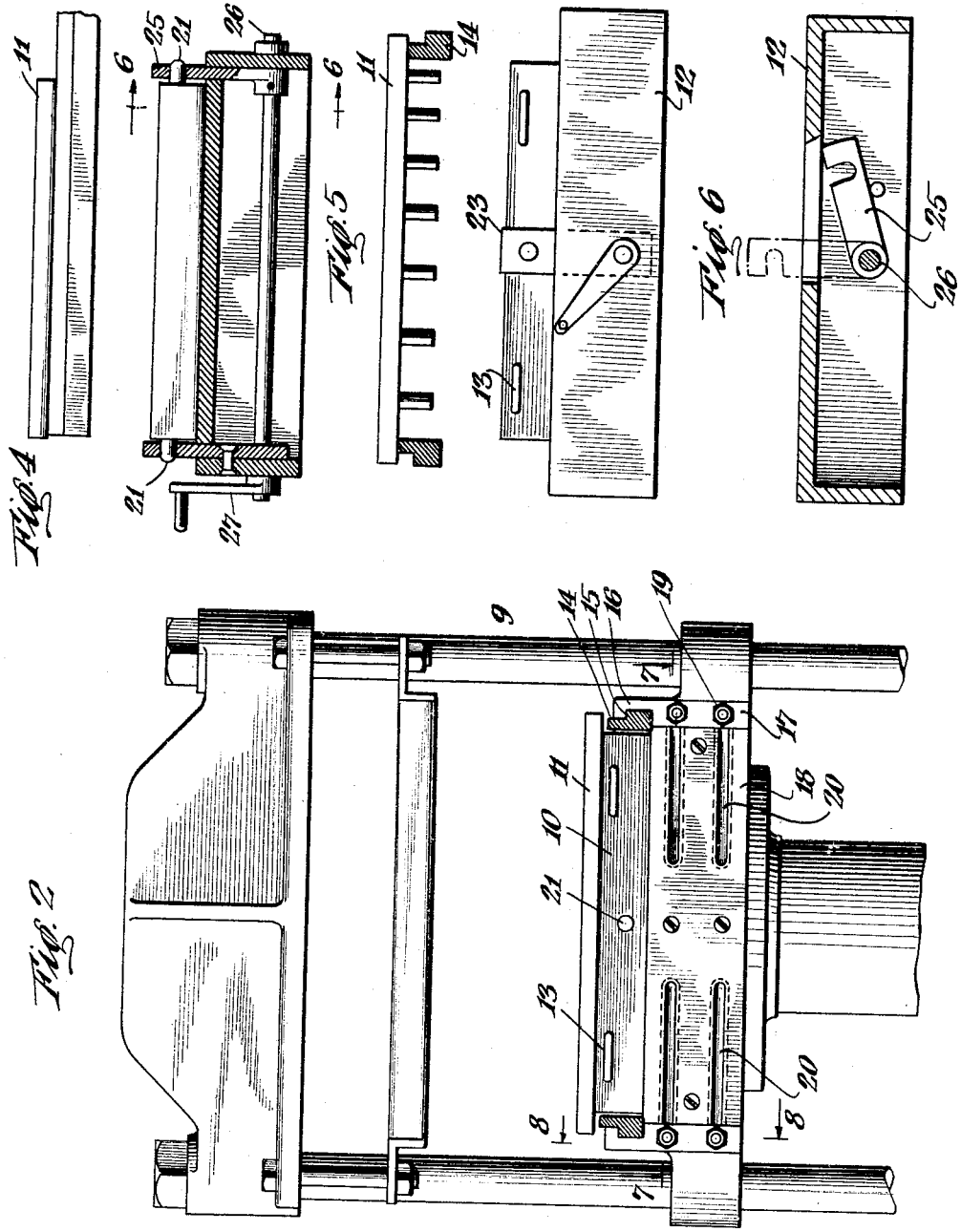
INVENTOR
George Goebel
BY
Hoguet & Neary
ATTORNEYS Dec. 27, 1932.  G. GOEBEL  1,891,976
MOLD OPENING APPARATUS
Filed Dec. 15, 1931  4 Sheets-Sheet 3
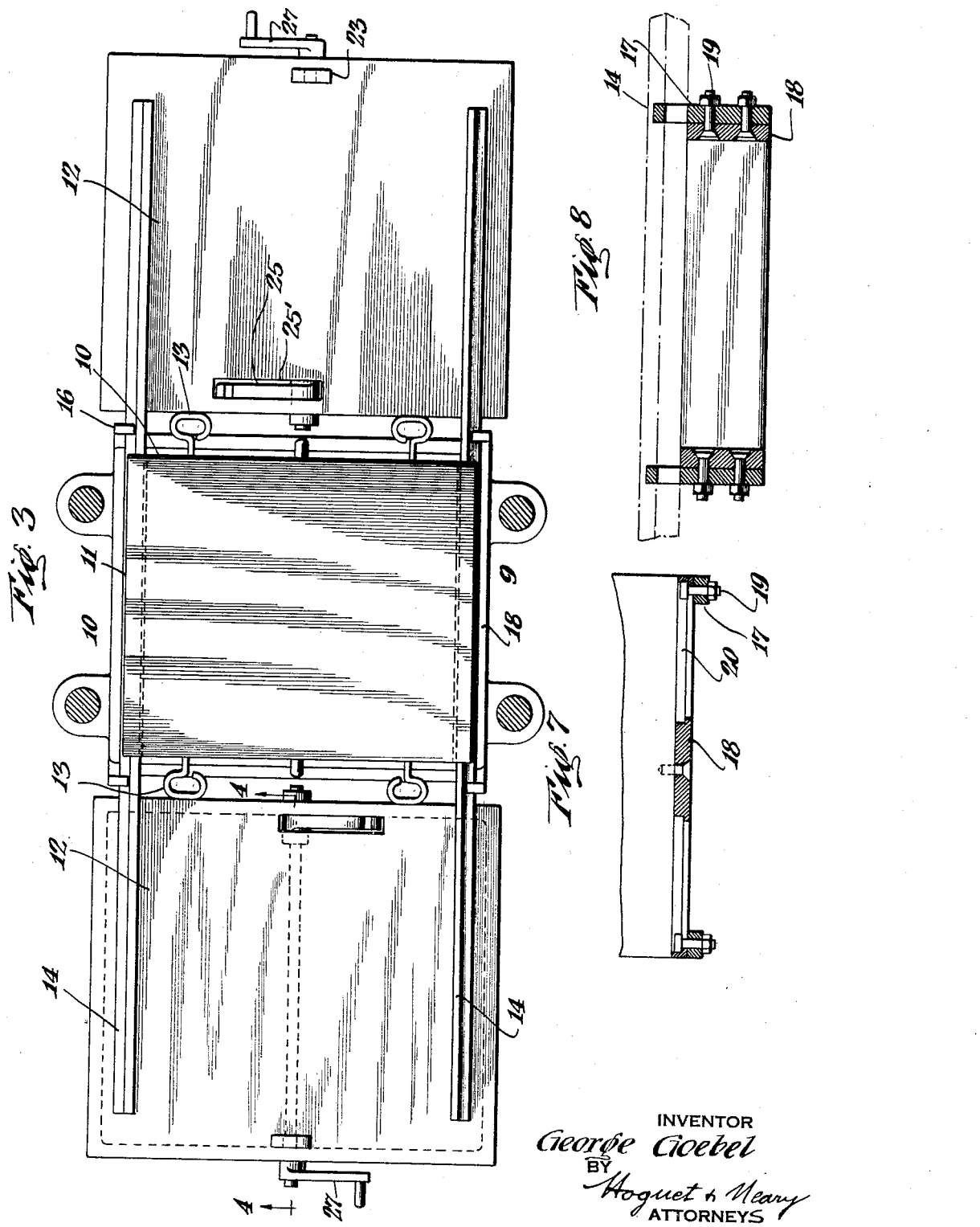
INVENTOR
George Goebel
BY
Hoguet & Neary
ATTORNEYS Dec. 27, 1932.    G. GOEBEL    1,891,976
MOLD OPENING APPARATUS
Filed Dec. 15, 1931    4 Sheets-Sheet 4
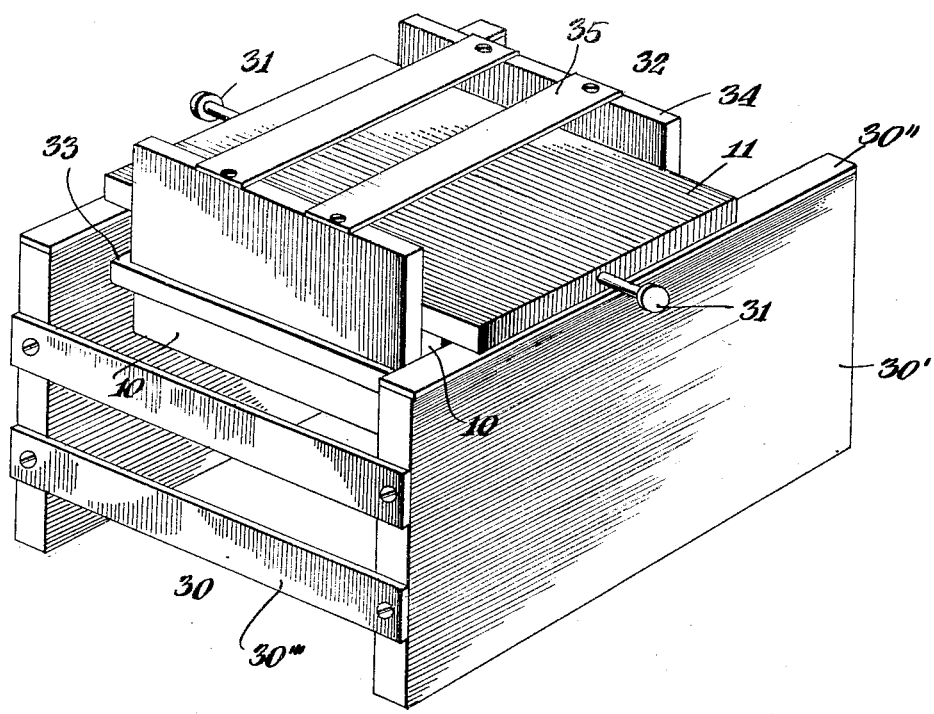
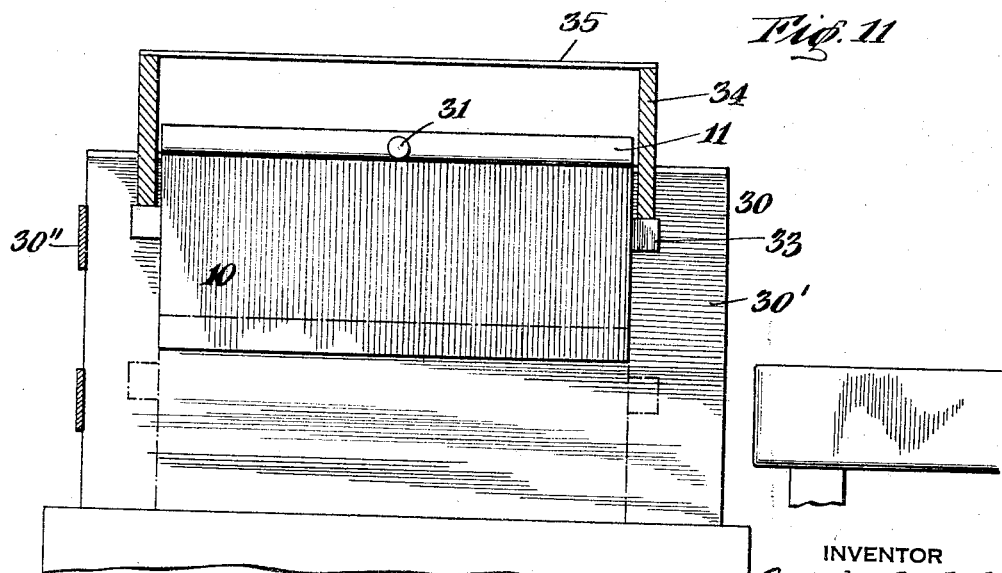
INVENTOR
George Goebel
BY Hoguet & Neary
ATTORNEYS Patented Dec. 27, 1932

1,891,976

UNITED STATES PATENT OFFICE

GEORGE GOEBEL, OF BRIDGEPORT, CONNECTICUT, ASSIGNOR TO CANFIELD RUBBER COMPANY, OF BRIDGEPORT, CONNECTICUT, A CORPORATION OF CONNECTICUT

MOLD OPENING APPARATUS

Application filed December 15, 1931. Serial No. 581,164.

My invention relates to improvements in means for opening separable molds and especially molds which are used in a press, generally a hydraulic press, to form various articles and the said articles are treated while in the mold or press. Such molds and such practice are usual in the manufacture of articles which contain more or less rubber, and where the mold has been subjected to heat and pressure in the treatment of such articles it has been found difficult to separate the mold parts; such separation is, in fact, so difficult that much time and effort is wasted in the practice.

Because of this difficulty efforts have been made to make presses which would separate mold parts, but the results have been rather complicated mechanism, frequently the use of auxiliary sub-presses and pistons or other attachments which have made the machine so expensive and the operation so complex that such apparatus has not been very generally used.

The general practice is still to use the rather simple hydraulic press in which a common type of separable mold is moved into and out of position easily, and the object of my invention is to provide simple means which can be used in connection with a conventional or common press and with the usual kind of separable mold so as to effect the easy separation of the mold parts after the molded articles have been formed and cured or treated. By this means a manufacturer can apply this simple attachment to a press without changing the character of the latter and make a substantial saving in his mold separation. In the accompanying drawings I have shown a simple means and a modification thereof to effect the foregoing results, but from the description herein it will be understood that the particular structures shown and described can be changed to a great extent without at all affecting the character of the invention.

An essential feature of the improvement, it will be noted, is that with a substantially conventional mold and the customary press I can provide means either within or without the press for anchoring one part of the mold and then have the main customary movable power part of the press or its piston, if it is a piston press, act to engage and separate the second part of the mold. Thus, it will be seen that no auxiliary apparatus is required and no change of the principal apparatus used for molding and treating articles.

Reference is to be had to the accompanying drawings forming a part of this specification, in which similar reference characters indicate corresponding parts in all the views.

Figure 1 is a broken sectional elevation of a press and mold fitted with my improvements;

Figure 2 is a broken front elevation of the mold and press;

Figure 3 is a sectional plan on the line 3—3 of Figure 1;

Figure 4 is a broken longitudinal section with parts separated showing means exterior of the press for anchoring the mold and lifting the upper part thereof;

Figure 5 is a sectional detail showing how the rails of the press engage the cover of the mold and showing the mold parts separated;

Figure 6 is a cross section on the line 6—6 of Figure 4;

Figure 7 is a detail section on the line 7—7 of Figure 2;

Figure 8 is a section on the line 8—8 of Figure 2;

Figure 9 is a broken detail perspective showing a modified means of anchoring the lower mold part; and Figures 10 and 11 are enlarged details in perspective and cross section of a modified means of effecting the mold separation.

I have shown the press 9 generally as a common form of hydraulic press in which rubber articles are treated and molded, and it will be understood that this press may be of any usual or preferred type. In it is placed the mold 10 having a cover portion 11, these parts being as usual except that it is essential that the cover have a little overhang, and this is not unusual in such molds. The mold 10 will, of course, have its interior parts adapted to give shape and effect the curing of desired articles and this has nothing to do with the present invention. At the sides of the press are tables 12 which should be substantial and firmly anchored to the ground or support, and the mold 10 is provided with suitable handles 13 on opposite sides so that it can be conveniently pulled from the press to a position upon either table 12. So far as my invention is concerned there may be one table, but I prefer to have two so that the mold can be pulled out from either side and it makes it more convenient because while one mold is being opened on the table 12, as hereinafter described, another can be in the press undergoing treatment and pressure.

As a simple and efficient means of effecting the mold separation and one that is easily applicable to any usual press, I prefer to use parallel rails 14 which are rigid on the movable part of the press and project outward over the tables 12. These rails can be attached in various ways, but I have shown them having shoulders 15, see Figure 2, which engage in the bracket arms 16 and the latter are attached to the plates 17 which, in turn, are secured to the frame 18 connected to and forming really a part of the press platen. It will be seen that by this means the rails 14 lie just below the projecting parts of the cover 11 so that when in the press the actions on or within the mold are not interfered with, but when pulled from the press the mold will be guided to position above a table 12, then when the lower part of the mold is anchored the continued upward pressure of the press platen and the rails 14 will lift the cover from the lower part of the mold.

Molds of various sizes can be used, and it is, therefore, desirable to have the rails 14 adjustable with relation to each other so as to fit molds of different sizes. A convenient way is shown in Figures 2, 7 and 8. As here illustrated, the bracket plates 17 are adjustable back and forth on the frame 18 which is slotted as at 20 and machine bolts 19 extend through the bracket plates and slots being counter sunk in the frame as shown in Figure 8, and then the bracket plates can be adjusted and held by tightening up the nuts on the machine bolts.

Various means of anchoring the lower mold part can be used without affecting the invention, and in the drawings I have shown a simple and preferred way. As here illustrated the lower mold member has on opposite sides projecting pins 21. When the mold is pushed or pulled from the press on a table 12, the outer pin will enter the hole 22 in the post 23 which is rigid on the table 12. The table has, preferably, a reinforced part 24 to carry the post and to stiffen the table. The opposite pin on the mold is engaged by a latch 25 shown in detail in Figure 6 which is carried by a crank shaft 26 extending beneath the table, as shown clearly in Figure 1, and having a crank handle 27 by which it may be operated. The latch 25 swings through a slot 25', see Figure 3, in the table top and can be turned up to engage the second pin 21 of the mold, and when thus anchored the upward movement of the rails 14 engaging the mold cover 11 easily separates the cover from the lower mold part.

In Figure 9 I have shown an alternative way of anchoring the outer part of the mold in which a post 23' is substituted for the post 23 and this has a mortice 29' which engages a tenon 29 on the member 28 which can be attached to the lower mold. From the foregoing description, it will be seen that it is a simple matter to attach the rails 14 or their equivalent to the movable part of the press, which may be standard, and that the anchoring means outside the press, that is, on the table 12, does not necessitate any change whatever in the press itself.

In Figures 10 and 11 I have shown a modified means by which the power of the main press piston can be used to operate and open the mold which can be substituted for the rails 14, the tables 12 and the mold anchoring means on the tables. As here illustrated, I employ two generally rectangular frames 30 and 32, the former being larger and adapted to seat within the press and on the platen thereof and the latter being adapted to engage the top of the press when the whole structure is raised. The frame 30 can be made in any conventional way, but I have shown it as I have used it with two opposed side pieces 30' preferably with a metallic top edge 30'' and cross connected by slats 30'''. The frame 32 has side pieces 34 adapted to rest on the ledge 33 with which the lower mold part 10 can be provided, while the upper mold part 11 is as already described. This has the projecting pins 31 which can be used as handles. The frame 32 has the side pieces 34 arranged at right angles to the side pieces 30' of the frame 30 and the side pieces 34 are cross connected by slats 35. Obviously interconnecting frames of this general character can be made in any other approved way, if desired, but as shown they illustrate how the structure works. In practice the lower frame 30 is placed in the press on the platen thereof; the mold 10 is positioned upon the frame with the part 11 resting on the side pieces 30' and the frame 32 straddles the mold in the other direction. When the platen rises the mold and both frames are carried upward, but when the frame 32 reaches the limit of its movement it checks the upward movement of the mold 10 by reason of its engagement with the ledge 33, while the continued movement of the frame 30 against the overhanging cover 11 lifts and raises the cover.

Thus it will be seen that without limiting myself to the particular construction shown I have illustrated a very simple means of applying structures to a standard press to enable mold opening to be done by the work of the power means of the press itself.

I claim:

1. A press for molding and treating molded articles, a separable mold movable as a whole in and out of the press, and means for separating the mold parts said means being operated by the main pressure means of the press.

2. A press for molding and treating molded articles, a separable mold movable as a whole in and out of the press, means for anchoring one part of the mold, and means operated by the main pressure part of the press for moving the second part of the mold to effect the separation thereof.

3. A piston operated press for molding and treating molded articles, a mold movable as a whole in and out of the press, and means actuated by the main press piston for separating the mold parts.

4. A piston operated press for molding and treating molded articles, a mold movable as a whole in and out of the press, means for anchoring one part of the mold, and means actuated by the main piston of the press for engaging and moving the second part of the mold to effect separation thereof.

5. A press for molding articles, a separable mold movable in and out of the press, means outside the press for anchoring one part of the mold, and means actuated by the press for engaging and removing the second part of the mold.

6. A molding press, a separable mold movable in and out of the press, means for anchoring one part of the mold at a point outside the press, and means actuated by the press for engaging and separating the second part of the mold.

7. A molding press, a separable mold movable in and out of the press, means for anchoring one part of the mold when removed from the press, and members carried by and projecting from the press to engage and separate the second part of the mold.

8. A molding press, a separable mold movable in and out of the press, means for anchoring one part of the mold when removed from the press, and members carried by the movable part of the press and projecting from the press said members engaging the second part of the mold both while in and out of the press and acting to move and separate said part.

9. A molding press, a separable mold movable in and out of the press, means for anchoring one part of the mold when removed from the press, and members carried by the movable part of the press adjustable with relation to each other and projecting from the press, said members engaging the second part of the mold both while in and out of the press and acting to move and separate said part.

10. A molding press, a separable mold movable in and out of the press, means for anchoring one part of the mold at a point outside the press, and rails on the movable part of the press, said rails projecting from the press and engaging the second part of the mold to effect its separation.

11. A molding press, a separable mold movable in and out of the press, said mold having an overhanging upper part, means for anchoring the lower part of the mold at a point outside the press, and rails secured to the movable part of the press and disposed to underlie the overhanging upper part of the mold.

12. A structure of the kind described comprising a molding press, a separable mold movable in and out of the press, mold supporting means adjacent the press, means carried by said table for engaging the lower part of a mold, and means carried by the movable part of the press disposed to engage and lift the upper part of the mold.

13. The combination with the press and a separable mold used in connection therewith, of a table adjacent the press, a locking device on the table to engage the lower part of said mold and rigid members carried by the movable part of said press and disposed to engage and lift the upper part of the mold.

14. The combination with the press and a separable mold used in the press and having projecting members on both its lower and upper parts, of a table adjacent the press, means on said table for engaging projections on the lower part of the mold and rigid members carried by the movable part of the press engaging the projections on the upper part of the mold.

15. The combination with a molding press and a separable mold used therein having projections on both its upper and lower members, of a table to support the mold, manually operated locking means to engage the lower mold part projections and lock said part to the table, and members carried by the movable part of the press engaging the projections on the upper part of the mold while on the table to separate said part from the lower part thereof.

In testimony whereof, I have signed my name to this specification this 11th day of December 1931.

GEORGE GOEBEL.